(12) United States Patent
Després

(10) Patent No.: US 7,290,774 B2
(45) Date of Patent: Nov. 6, 2007

(54) WHEEL UNIT FOR SKI-MOUNTED VEHICLE

(76) Inventor: Jean Després, 147, Chemin des Raymond, Rivière du Loup, Quebec (CA) G5R 5X9

( * ) Notice: Subject to any disclaimer, the term of this patent is extended or adjusted under 35 U.S.C. 154(b) by 110 days.

(21) Appl. No.: 11/327,469

(22) Filed: Jan. 9, 2006

(65) Prior Publication Data

US 2006/0151983 A1    Jul. 13, 2006

(30) Foreign Application Priority Data

Jan. 8, 2005    (GB) ................... 0500309.0

(51) Int. Cl.
*B62B 17/06* (2006.01)

(52) U.S. Cl. .................. 280/28; 280/9; 280/11; 180/182

(58) Field of Classification Search ............ 280/28, 280/809, 7.12, 9, 10, 11; 180/182
See application file for complete search history.

(56) References Cited

U.S. PATENT DOCUMENTS

| | | | | |
|---|---|---|---|---|
| 1,308,937 A | * | 7/1919 | Crane | ............... 180/183 |
| 3,218,006 A | * | 11/1965 | Albright | ............... 244/50 |
| 3,570,617 A | * | 3/1971 | O'Day | ............... 180/184 |
| 3,593,814 A | * | 7/1971 | Bauler | ............... 280/8 |
| 3,709,512 A | * | 1/1973 | Albertson | ............... 280/28 |
| 3,726,354 A | * | 4/1973 | LaPlante | ............... 280/21.1 |
| 3,844,367 A | * | 10/1974 | Flohr | ............... 280/28 |
| 4,390,151 A | * | 6/1983 | Schneider | ............... 244/108 |
| 5,439,237 A | * | 8/1995 | Kutchie | ............... 280/11 |
| 6,527,282 B2 | * | 3/2003 | Ouellette | ............... 280/7.14 |
| 6,824,147 B2 | * | 11/2004 | Ouellette | ............... 280/7.14 |
| 6,889,987 B2 | * | 5/2005 | Ouellette | ............... 280/9 |
| 6,932,359 B2 | * | 8/2005 | Ouellette | ............... 280/7.14 |
| 6,983,943 B2 | * | 1/2006 | Ouellette | ............... 280/28 |

* cited by examiner

*Primary Examiner*—Jeff Restifo

(57) ABSTRACT

A wheel unit mountable on a ski of a ski-mounted vehicle includes an actuating plate defining a wheel attachment section and a piston attachment section The actuating plate is pivotally attached to the ski intermediate the wheel and piston attachment sections for pivotal movement about a plate pivotal axis. A wheel attachment assembly is provided for rotatably attaching the wheel to the wheel attachment section. An actuator is operatively coupled to the actuating plate for selectively pivoting the actuating plate about the plate pivotal axis between a plate deployed configuration and a plate retracted configuration wherein in the plate deployed configuration the position of the actuating plate is such that the wheel protrudes at least partially below the ski gliding surface for engaging the ground surface and in the plate retracted configuration the position of the actuating plate is such that the wheel is retracted above the ski gliding surface for preventing the wheel from engaging the ground surface. A plate transversal moving assembly is operatively coupled to the actuating plate for selectively moving the actuating plate substantially transversally relative to the ski.

17 Claims, 9 Drawing Sheets

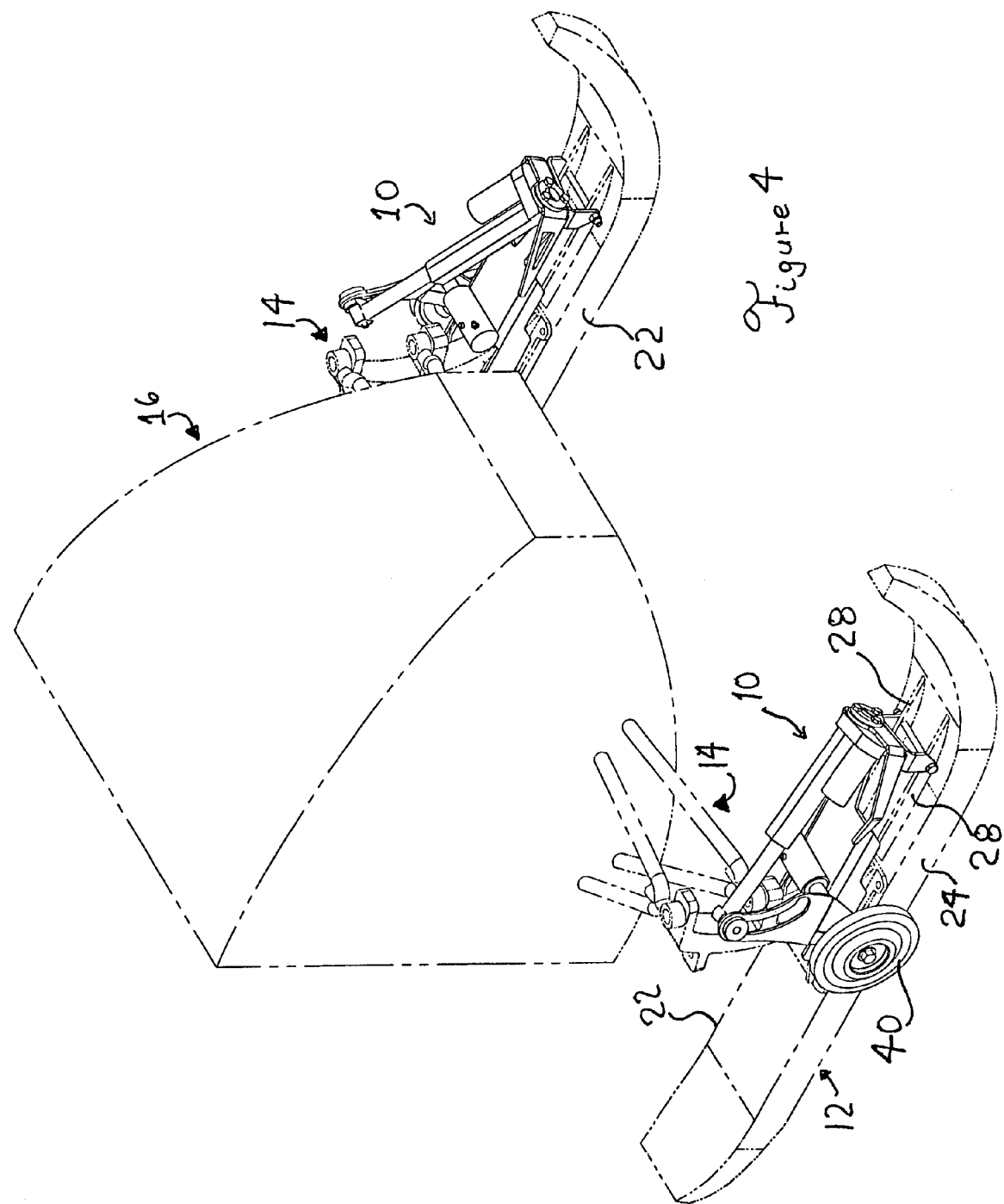

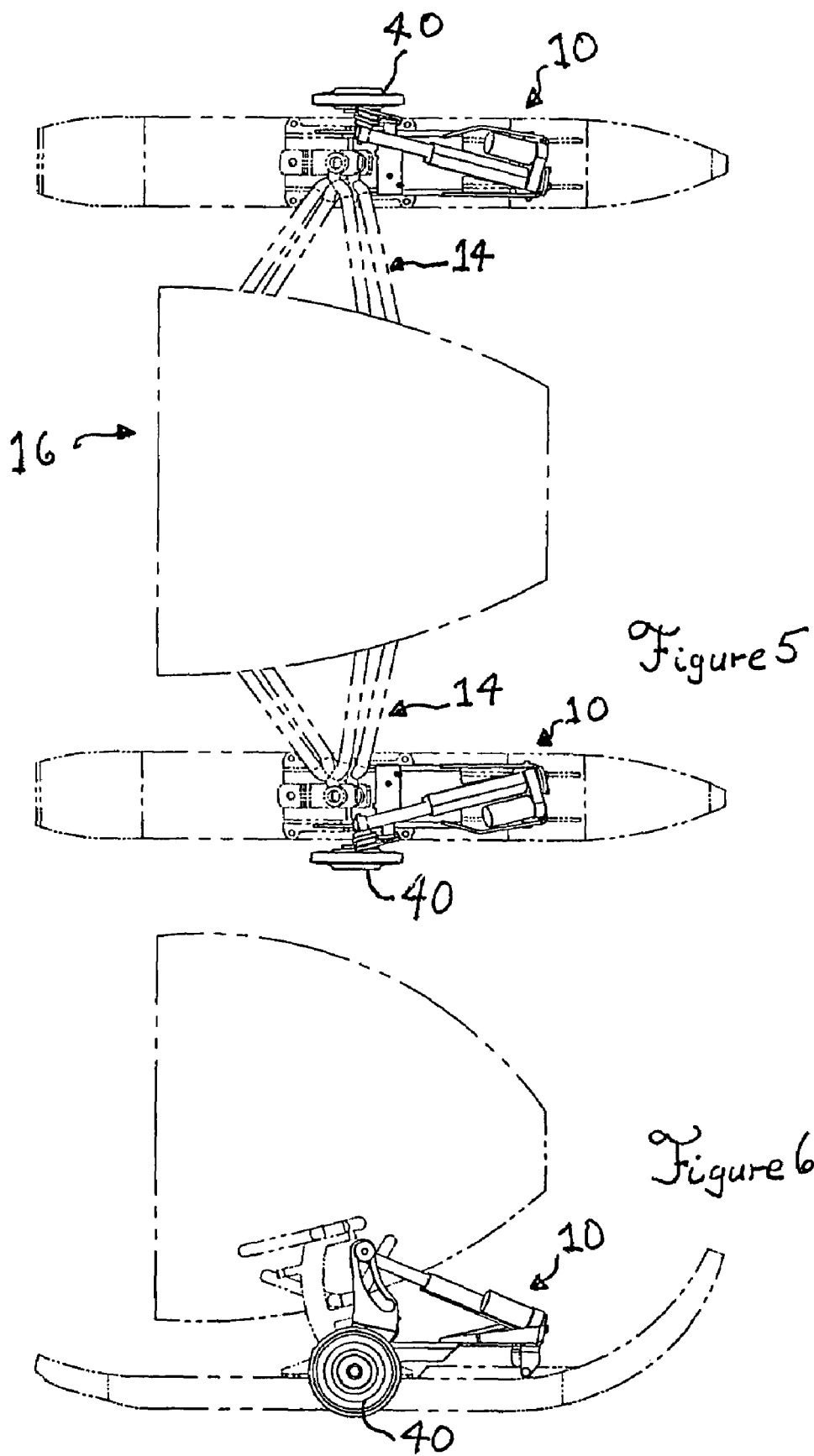

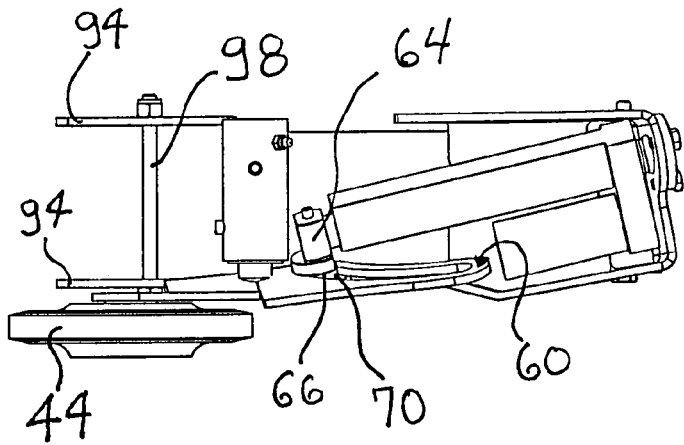
Figure 8
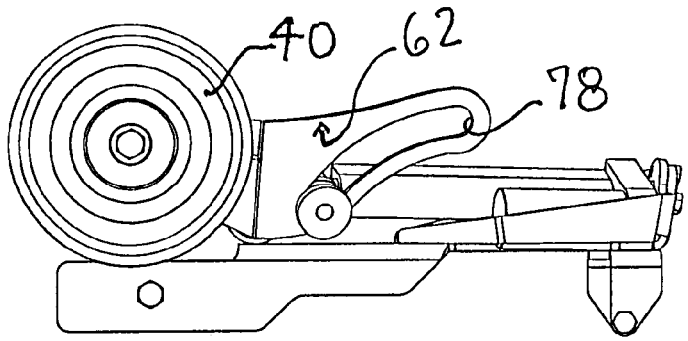 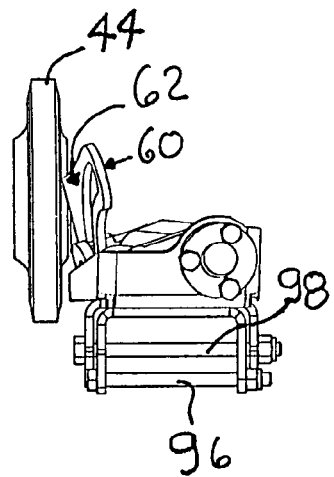
Figure 9
Figure 10

WHEEL UNIT FOR SKI-MOUNTED VEHICLE

FIELD OF THE INVENTION

The present invention relates to the general field of ski-mounted vehicles such as snowmobiles and is particularly concerned with a wheel unit mountable on a ski of a ski-mounted vehicle.

BACKGROUND OF THE INVENTION

Snowmobiles are designed to ride primarily upon snow or ice, and, to this end, are provided with a pair of skis pivotally mounted adjacent the fore end of the snowmobile for gliding across the surface of the snow or ice. An endless drive track is disposed typically medially and rearwardly under the body of the snowmobile and aft of the skis. Typically, the skis are provided with a runner made out of carbide or other suitable material that runs along at least a portion of the bottom surface of the ski to keep the snowmobile travelling along a track.

Although quite useful and efficient in their intended environment, conventional snowmobiles are not well-suited for being driven across rougher surfaces such as pavement, concrete, gravel or the like deprived of snow or ice. When the skis of conventional snowmobiles are driven across such non-snow surfaces, they are relatively rapidly subjected to excessive wear. Accordingly, for example, the carbide runners may require more frequent replacement. Furthermore, when a conventional snowmobile is driven across a non-snow surface, it becomes relatively difficult to steer since the skis lose much of their usefulness.

In order to increase the versatility of conventional snowmobiles by circumventing some of the hereinabove-mentioned disadvantages, some wheel units attachable to snowmobile skis have been developed. However, the snowmobile wheel units shown in the prior art suffer from numerous drawbacks. For example, some prior art wheel units are relatively complex and, hence, relatively expensive. Furthermore, such prior wheel units often suffer from being mechanical failure and, as such, are considered unreliable.

Also, some prior art units require manual skill and/or strength in order for the wheel to be deployed and/or retracted. Furthermore, some prior art wheel units suffer from being unprotected against relatively commonly encountered obstacles and are, hence, subject to being damaged during use of the snowmobile.

Accordingly, there exists a need for an improved snowmobile wheel unit.

SUMMARY OF THE INVENTION

It is a general object of the present invention to provide an improved snowmobile wheel unit.

SUMMARY OF THE INVENTION

In accordance with the present invention, there is provided a wheel unit mountable on a ski of a ski-mounted vehicle, the ski having a ski gliding surface for traveling over a ground surface, a substantially opposed ski upper surface, a ski inner side surface, a substantially opposed ski outer side surface, the ski defining a ski longitudinal axis; the wheel unit comprising: an actuating plate, the actuating plate defining a wheel attachment section and a piston attachment section, the actuating plate being pivotally attached to the ski substantially intermediate the wheel and piston attachment sections for pivotal movement about a plate pivotal axis; a wheel attachment means for rotatably attaching the wheel to the wheel attachment section for rotation about a wheel rotation axis; an actuator operatively coupled to the actuating plate for selectively pivoting the actuating plate about the plate pivotal axis between a plate deployed configuration and a plate retracted configuration wherein in the plate deployed configuration the position of the actuating plate is such that the wheel protrudes at least partially below the ski gliding surface for engaging the ground surface and in the plate retracted configuration the position of the actuating plate is such that the wheel is retracted above the ski gliding surface for preventing the wheel from engaging the ground surface; a plate transversal moving means operatively coupled to the actuating plate for selectively moving the actuating plate substantially transversally relative to the ski.

Conveniently, the plate transversal moving means is operatively coupled to the actuating plate so as to automatically move the actuating plate substantially transversally relative to the ski longitudinal axis in a predetermined direction upon the actuating plate being pivoted about the plate pivotal axis, wherein when the actuating plate is pivoted towards the plate deployed configuration the actuating plate is simultaneously displaced substantially laterally outwardly relative to the ski-mounted vehicle and when the actuating plate is pivoted towards the plate retracted configuration the actuating plate is simultaneously displaced substantially laterally inwardly relative to the ski-mounted vehicle; whereby when the actuating plate is simultaneously pivoted towards the plate deployed configuration and displaced substantially laterally outwardly relative to the ski-mounted vehicle the wheel is moved towards a wheel ground engaging position and when the actuating plate is simultaneously pivoted towards the plate retracted configuration and displaced substantially laterally inwardly relative to the ski-mounted vehicle the wheel is moved towards a wheel ground clearing position, the wheel ground engaging position being located at a lower and more outwardly lateral location then the wheel ground clearing position.

Typically, the actuator is a piston-type actuator, the piston-type actuator having a piston rod and a piston sleeve, the piston rod being movable relative to the piston sleeve between a rod receded configuration and a rod extended configuration; the wheel unit also including a piston-to-plate coupling means for coupling the piston rod to the piston attachment section of the actuating plate, the piston-to-plate coupling means allowing the conversion of the linear movement of the piston rod between the rod receded and extended configurations into a pivotal movement of the actuating plate about the plate pivotal axis between the plate retracted and plate deployed configurations.

Conveniently, the piston-to-plate coupling means includes a rod coupling pin extending substantially laterally from the piston rod and a guiding slot formed in the piston attachment section of the actuating plate, the guiding slot being configured, sized and positioned for receiving and slidably guiding at least a portion of the rod coupling pin for converting the linear movement of the piston rod between the rod receded and extended configurations into a pivotal movement of the actuating plate about the plate pivotal axis between the plate retracted and plate deployed configurations.

Typically, the actuating plate defines a plate first surface and a plate second surface, the guiding slot extending through the piston attachment section of the actuating plate between the plate first and second surfaces; the piston-to-plate coupling means including a rod coupling block anchored to the piston rod, the rod coupling block defining a block abutment surface facing substantially towards the plate first surface, the rod coupling block extending substantially perpendicularly from the block abutment surface; the piston-to-plate coupling means also including a pin retaining component mounted on the rod coupling pin in an outwardly spaced relationship relative to the block abutment surface so as to define a circumferential plate receiving section on the rod coupling pin between the pin retaining component and the block abutment surface; the plate receiving section being inserted in the guiding slot with the block abutment surface and the pin retaining component positioned substantially adjacent respectively to the plate first and second surfaces for preventing the lateral withdrawing of the rod coupling pin from the guiding slot as the rod coupling pin slides along the guiding slot.

Conveniently, the actuating plate has a substantially elongated configuration, the actuating plate defining a plate first longitudinal edge and a plate second longitudinal edge, the plate first longitudinal edge being located substantially above the plate second longitudinal edge when the actuating plate is in the plate retracted configuration; the guiding slot defining a slot proximal end and a slot distal end the slot proximal and distal ends being positioned respectively more proximally and more distally relative to the wheel attachment section, the guiding slot having a substantially curved configuration and being substantially convex relative to the plate first longitudinal edge.

Typically, the plate pivotal axis and the slot proximal end are located substantially at the same height, the guiding slot being provided with a slot locking segment located substantially adjacent to the slot proximal end, the slot locking segment having a smaller radius of curvature then the remainder of the guiding slot.

Conveniently, the slot proximal and distal ends are also located respectively more proximally and distally relative to the plate second longitudinal edge, the guiding slot being configured and sized so that the slot distal end is located in a substantially overlying relationship relative to the wheel rotation axis when the actuating plate is in the plate deployed configuration.

Typically, the piston sleeve is pivotally attached to the ski by a piston-to-ski attachment means for allowing the piston sleeve to remain attached to the ski while pivoting relative to the ski about two different sleeve pivotal axes; the piston sleeve being attached to the ski so as to pivot substantially upwardly and laterally outwardly relative to the ski longitudinal axis when the piston rod moves from the rod receded configuration towards the rod extended configuration. By way of example, the piston-to-ski attachment means includes a ball and socket-type assembly.

Conveniently, the wheel and piston attachment sections of the actuating plate are angled relative to each other such that when the actuating plate is in the plate deployed configuration, the wheel attachment section is in a substantially parallel relationship relative to the ski longitudinal axis and the piston attachment section is in a substantially parallel relationship relative to the piston-type actuator.

Typically, the wheel unit includes a unit mounting structure for mounting the wheel unit to the ski, the unit mounting structure including a base plate defining a base plate first end and a substantially opposed base plate second end, the base plate having a pair of first mounting flanges and a pair of second mounting flanges extending substantially perpendicularly therefrom respectively adjacent the base plate first and second end; a first mounting slot and a second mounting bolt extend respectively between the first and second pairs of mounting flanges; a piston mounting wall extends substantially upwardly from the base plate substantially adjacent the base plate first end.

Conveniently, the plate transversal moving means includes a substantially cylindrical biasing bar, the biasing bar defining a bar first end, a longitudinally opposed bar second end; the biasing bar being attached to the actuating plate substantially adjacent to the bar first end for rotating jointly therewith about the plate pivotal axis; a bar receiving sleeve, the bar receiving sleeve having a sleeve peripheral wall defining a sleeve channel for receiving at least a portion of the biasing bar; the biasing bar being at least partially insertable in the sleeve channel for rotation therein about the plate pivotal axis and for sliding movement therein along the plate pivotal axis; a tongue and groove arrangement mechanically coupling the sleeve peripheral wall and the biasing bar such that upon the biasing bar being rotated about the plate pivotal axis, the biasing bar is induced into a translational sliding movement along the plate pivotal axis by the configuration of the groove part of the tongue and groove arrangement.

Typically, the tongue and groove arrangement includes a tongue extending substantially radially outwardly from the outer surface of the biasing bar and the groove is formed in the sleeve peripheral wall.

Advantages of the present invention include that the proposed wheel unit allows for the conversion of a ski-supported vehicle into a wheeled vehicle and back to a ski-supported vehicle through a set of quick and ergonomic steps without requiring special tooling, manual dexterity and/or strength. The proposed wheel unit is designed so as to provide easily deployable or retractable wheels, as the condition requires.

In a retracted position, the wheel is raised above the gliding surface of the ski allowing for standard snowmobile mode of operation. In a deployed configuration, the wheel of the unit is lowered below the gliding surface of the ski. In this deployed configuration, the wheel unit holds the corresponding ski above the rolling surface of the wheel and allows the snowmobile to ride on wheels and the conventional endless track at the rear end.

In this deployed configuration, the snowmobile remains relatively steerable with the handle bars. Furthermore, the skis, and in particular the carbide runners on the underside surface of the skis, are not subject to excessive wear.

The proposed wheel unit is designed so as to be installable on conventional skis without requiring special tooling or manual dexterity. Furthermore, the proposed wheel unit is designed so as to be easily installable through a set of quick and ergonomic steps without damaging the conventional skis. The proposed wheel unit is designed so as to be easily retrofittable on conventional snowmobile skis.

Furthermore, the proposed wheel unit is designed so as to be relatively mechanically simple yet efficient so as to provide a wheel unit that will be economically feasible and also reliable in operation.

Yet, still furthermore, the proposed wheel unit is designed so as to provide a lateral movement of the wheel as the latter moves between its deployed and retracted configurations. More specifically, as the wheel is moved towards its deployed configuration, the wheel is displaced laterally outwardly so as to clear the ski and provide a relatively large sustentation base. Conversely, when the wheel is moved towards its retracted configuration, the wheel is simultaneously pulled radially inwardly so as to lessen the risk of the wheel causing obstruction in being subjected to impact by surrounding debris or objects.

BRIEF DESCRIPTION OF THE DRAWINGS

An embodiment of the present invention will now be disclosed, by way of example, in reference to the following drawings, in which:

FIG. 4, in a front perspective view, illustrates the components shown in FIGS. 1 through 3 with the wheels of the wheel units in their ground engaging position;

FIG. 5, in a top view, illustrates the components such as shown in FIG. 4;

FIG. 6, in a side elevational view, illustrates the components such as shown in FIGS. 4 and 5;

FIG. 8, in a top view, illustrates the wheel units shown in FIG. 7;

FIG. 9, in a side elevational view, illustrates the wheel units shown in FIGS. 7 and 8;

FIG. 10, in a front view, illustrates the wheel units shown in FIGS. 7 through 9;

DETAILED DESCRIPTION

Figure 1:
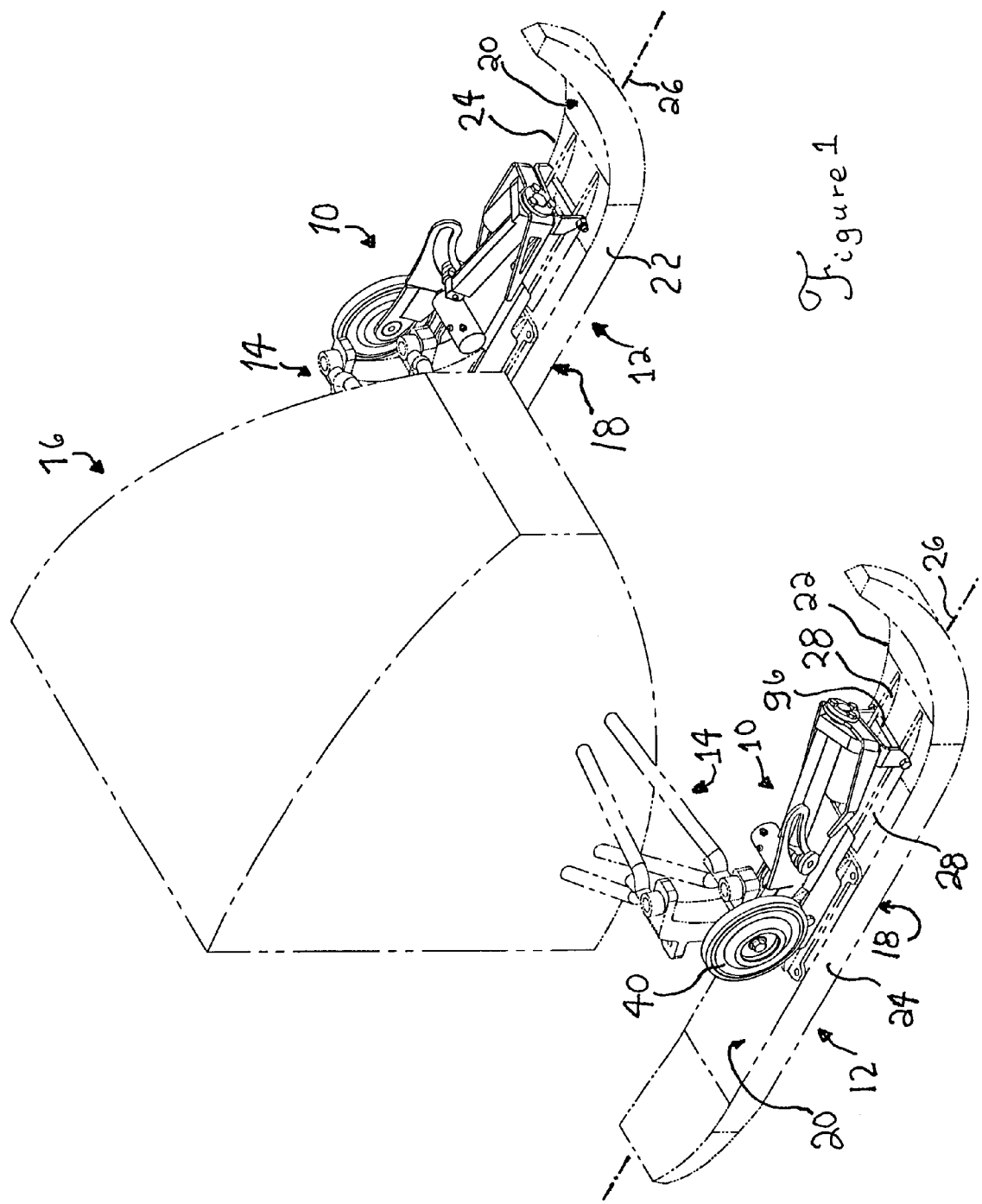
FIG. 1, in a partial perspective view with sections taken out, illustrates a pair of wheel units in accordance with an embodiment of the present invention, each mounted on a corresponding ski part of a ski-mounted vehicle, the wheels of the wheel units being shown in a ground clearing position; only a front portion of the ski mounted vehicle being schematically shown.
Figure 2:
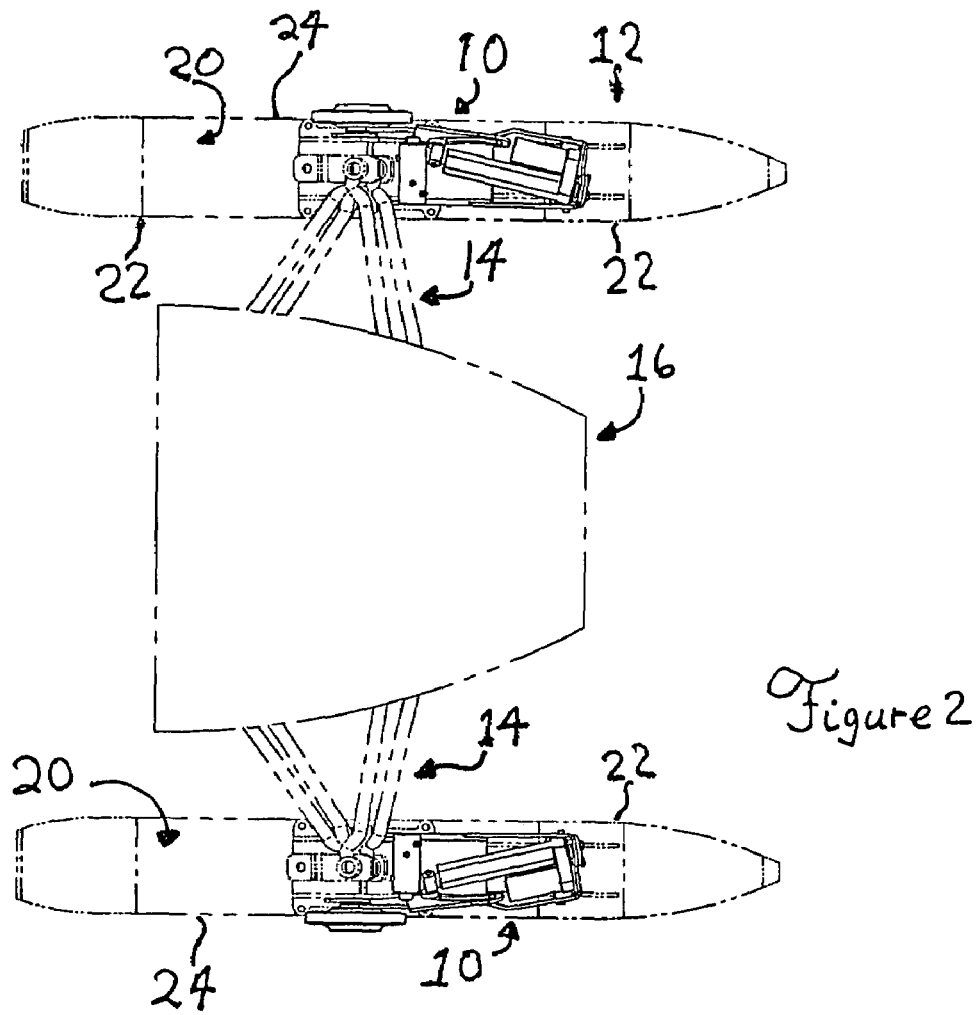
FIG. 2, in a top view, illustrates the components shown in FIG. 1.
Figure 3:
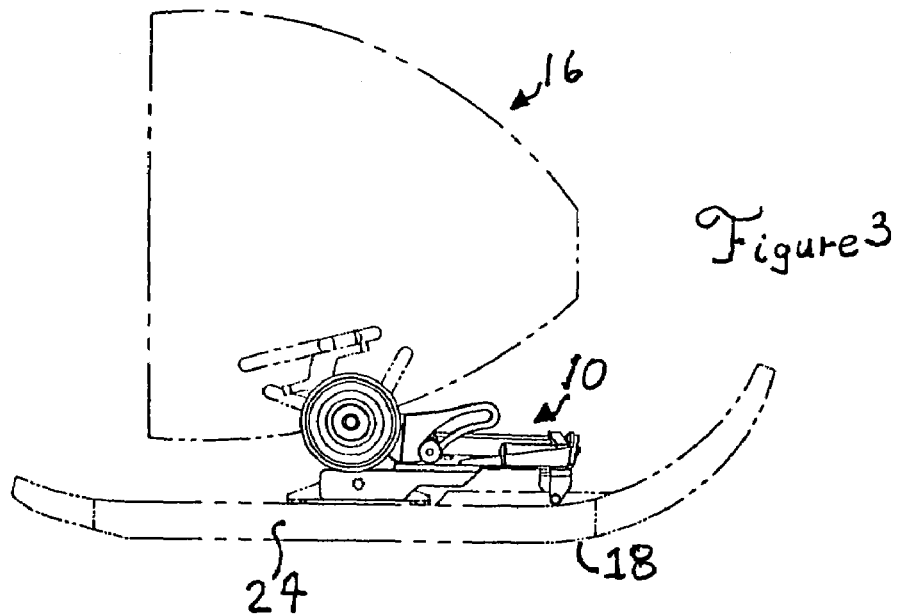
FIG. 3, in a side elevational view, illustrates the components shown in FIGS. 1 and 2.

Referring to FIG. 1, there is shown a pair of wheel units, in accordance with an embodiment of the present invention, each generally indicated by the reference numeral 10. Each wheel unit 10 is shown mounted on a corresponding ski generally indicated by the reference numeral 12. Each ski 12 is attached by a suitable ski-to-vehicle attachment assembly 14 to a vehicle such as a snowmobile or other ski-mounted vehicle schematically represented and referred to by the reference numeral 16.

It should be understood that the wheel units 10 could be used with any suitable type of ski-mounted vehicle and with various types of skis without departing from the scope of the present invention. The skis 12 and the schematically represented vehicle 16 are only shown by way of example.

Each ski 12 typically has a ski gliding surface 18 for travelling over a suitable ground surface. Each ski 12 typically also has a substantially opposed ski upper surface 20, a ski inner side surface 22 and a substantially opposed ski outer side surface 24. Each ski 12 typically has a substantially elongated configuration and defines a corresponding ski longitudinal axis 26.

The skis 12 may be attached by various types of attachment assemblies to the vehicle 16. In some instances, the attachment assembly used for attaching the skis 12 to the vehicle 16 includes a so-called king pin on which a spindle is mounted. (Both the king pin and spindle not being shown). In some instances, such as shown throughout the Figures, the ski upper surface 20 is provided with a pair of ski flanges 28 extending substantially upwardly therefrom in a parallel relationship relative to each other. Again, it should be understood that the wheel unit 10 could be used with other types of skis using other types of ski-to-vehicle attachment assemblies without departing from the scope of the present invention.

Figure 7:
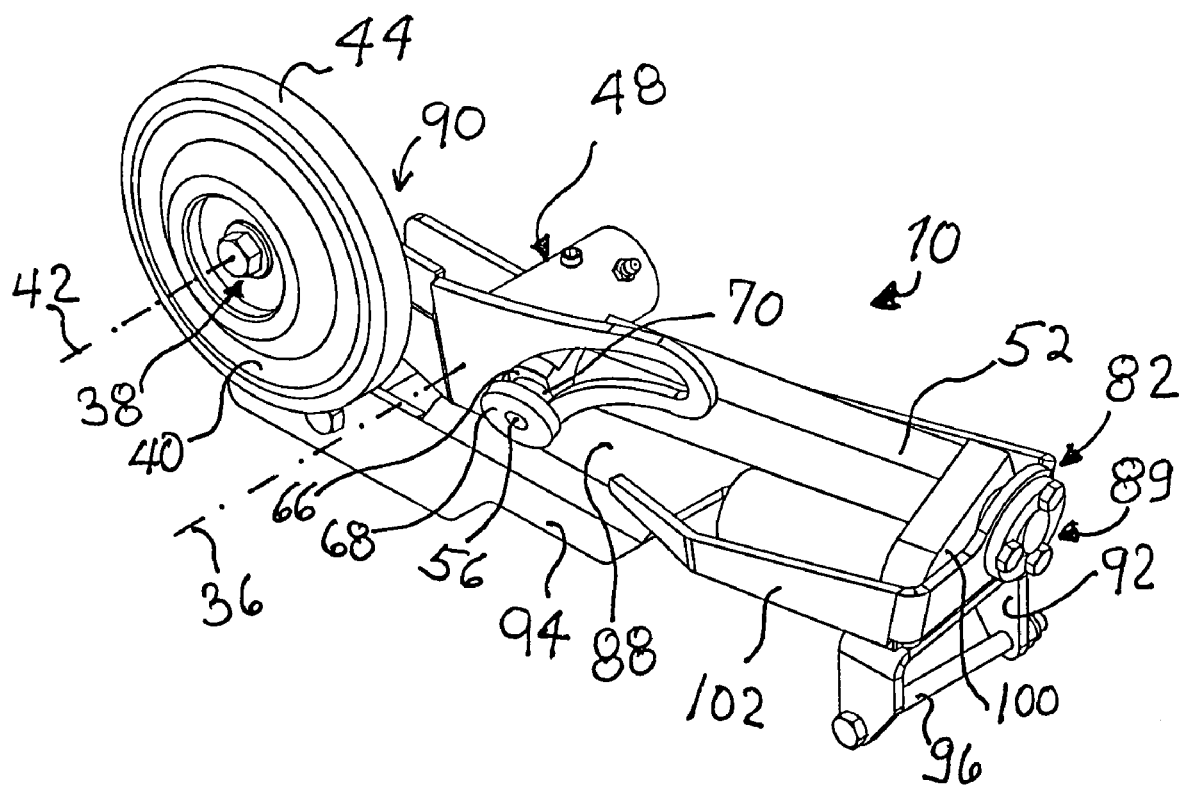
FIG. 7, in a perspective view, illustrates a wheel unit in accordance with an embodiment of the present invention, the wheel unit being shown with the wheels in a ground clearing position.
Figure 11:
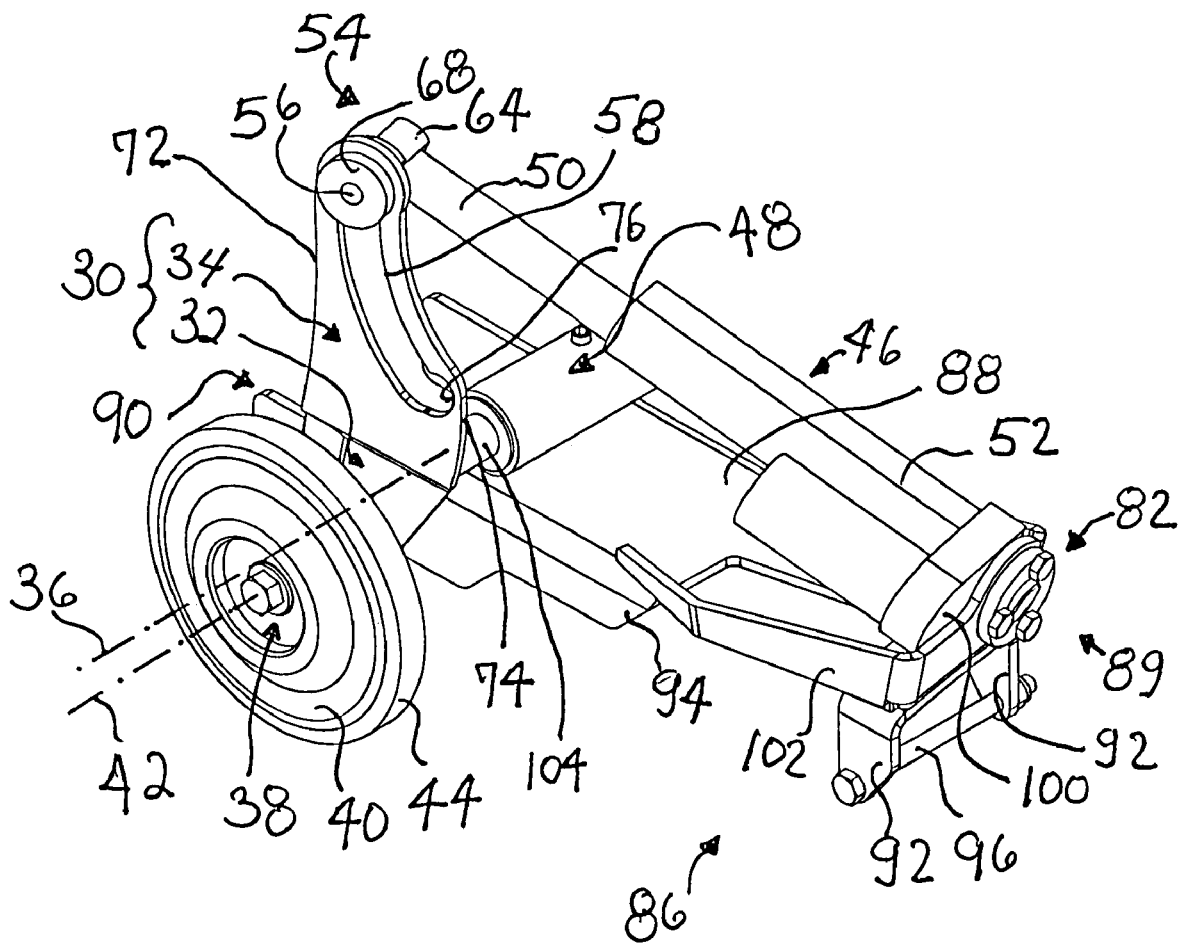
FIG. 11, in a perspective view, illustrates a wheel unit in accordance with an embodiment of the present invention, the wheel unit being shown with its wheel in a ground engaging position.
Figure 12:
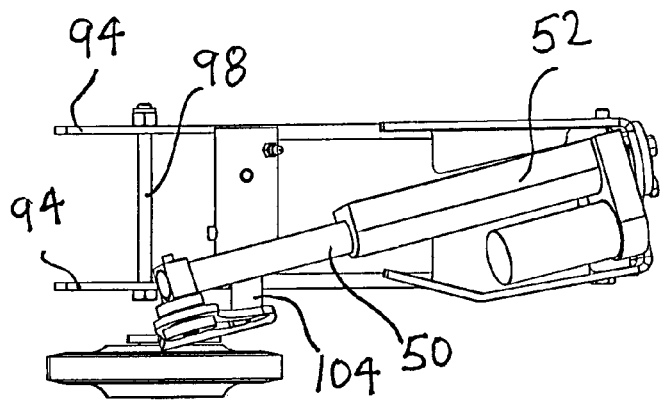
FIG. 12, in a top view, illustrates the wheel unit shown in FIG. 11.
Figure 13:
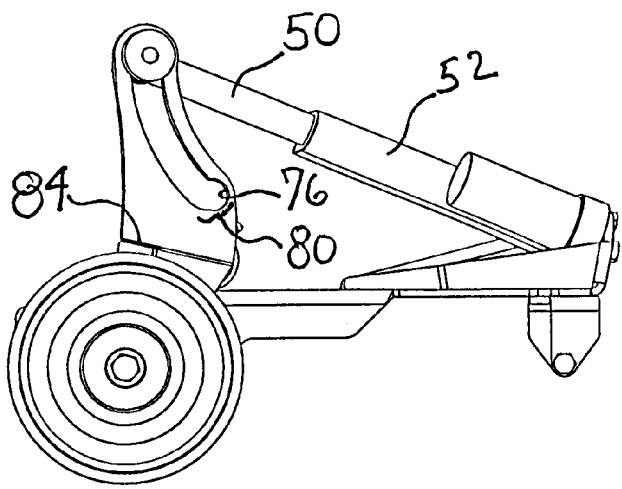
FIG. 13, in a side elevational view, illustrates the wheel unit shown in FIGS. 11 and 12.

Referring now more specifically to FIGS. 7 and 11, there is shown in greater details some of the features of the wheel unit 10 shown respectively with its wheel in a ground clearing and a ground engaging position. The wheel unit 10 includes an actuating plate generally indicated by the reference numeral 30. The actuating plate 30 defines a wheel attachment section 32 and a piston attachment section 34. The actuating plate 30 is pivotally attached to the ski 12 substantially intermediate the wheel and piston attachment sections 32, 34 for pivotal movement about a plate pivotal axis 36.

A wheel attachment means or assembly, generally indicated by the reference numeral 38, is provided for rotatably attaching a wheel 40 to the wheel attachment section 32 for rotation about a wheel rotation axis 42. The wheel attachment means or assembly 38 may take any suitable form such as a conventional wheel axle, a nut and bolt assembly or the like. The wheel 40 is preferably of the type adapted to withstand relatively harsh conditions. The wheel 40 defines a wheel outer peripheral edge 44 for contacting the ground surface.

The wheel unit 10 also includes an actuator, generally indicated by the reference numeral 46, operatively coupled to the actuating plate 30 for selectively pivoting the actuating plate 30 about the plate pivotal axis 36 between a plate deployed configuration shown in FIG. 11 and a plate retracted configuration shown in FIG. 7. In the plate deployed configuration, the position of the actuating plate 30 is such that the wheel 40, and more specifically at least the outer peripheral edge 44 thereof, protrudes at least partially below the ski gliding surface 18 for engaging the ground surface. In the plate retracted configuration shown in FIG. 7, the position of the actuating plate 30 is such that the wheel 40 is retracted above the ski gliding surface 18 for preventing the wheel 40 from engaging the ground surface. Typically, although by no means necessarily, the wheel 40 is retracted so as to be substantially above the ski upper surface 20.

The wheel unit 10 also includes a plate transversal moving means or assembly, generally indicated by the reference numeral 48, operatively coupled to the actuating plate 30 for selectively moving the actuating plate 30 substantially transversely relative to the ski 12. Typically, the plate transversal moving means or assembly 48 is operatively coupled to the actuating plate 30 so as to automatically move the actuating plate 30 substantially transversely relative to the ski longitudinal axis 26 in a predetermined direction upon the actuating plate 30 being pivoted about the plate pivotal axis 36.

Typically, when the actuating plate 30 is pivoted towards the plate deployed configuration shown in FIG. 11, the actuating plate 30 is simultaneously displaced substantially laterally outwardly relative to the ski-mounted vehicle 16. Conversely, when the actuating plate 30 is pivoted towards the plate retracted configuration shown in FIG. 7, the actuating plate 30 is simultaneously displaced substantially laterally inwardly relative to the ski-mounted vehicle 16.

Hence, typically, when the actuating plate 30 is simultaneously pivoted towards the plate deployed configuration and displaced substantially laterally outwardly relative to the ski-mounted vehicle 16, the wheel 40 is moved towards a wheel ground engaging position shown in FIG. 11. Conversely, when the actuating plate 30 is simultaneously pivoted towards the plate retracted configuration shown in FIG. 7 and displaced substantially laterally inwardly relative to the ski-mounted vehicle 16, the wheel 40 is moved towards a wheel ground clearing position. As shown throughout the Figures, and more particularly in FIGS. 10 and 14, the wheel ground engaging position is typically located at a lower and more outwardly lateral location than the wheel ground clearing position.

The actuator 46 may be of any suitable type such as a linear-type actuator or the like. The actuator 46 shown throughout the drawings is a piston-type actuator. The piston-type actuator has a piston rod 50 and a piston sleeve 52. The piston rod 50 is movable relative to the piston sleeve 52 between a rod receded configuration shown in FIG. 7 and a rod extended configuration shown in FIG. 11.

The wheel unit 10 also includes a piston-to-plate coupling means or assembly, generally indicated by the reference numeral 54, for coupling the piston rod 50 to the piston attachment section 34 of the actuating plate 30. The piston-to-plate coupling means or assembly 54 allows the conversion of the linear movement of the piston rod 50 between the rod receded and extended configurations into a pivotal movement of the actuating plate 30 about the plate pivotal axis 36 between the plate retracted and plate deployed configurations.

The piston-to-plate coupling means or assembly 54 could take any suitable form. In the embodiment shown throughout the Figures, the piston-to-plate coupling means or assembly 54 includes a rod coupling pin 56 extending substantially laterally from the piston rod 50 and a guiding slot 58 formed in the piston attachment section 34 of the actuating plate 30. The guiding slot 58 is configured, sized and positioned for receiving and slidably guiding at least a portion of the rod coupling pin 56 for converting (?) the linear movement of the piston rod 50 into the pivotal movement of the actuating plate 30.

Figure 14:
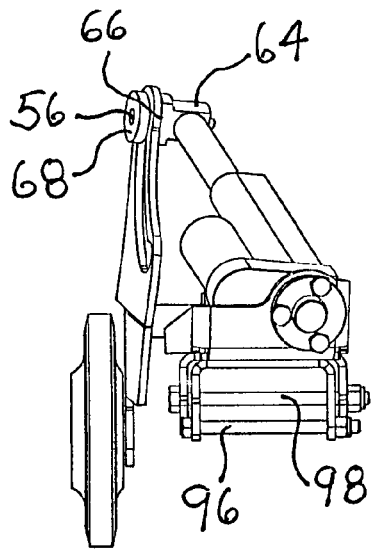
FIG. 14, in a front view, illustrates the ground unit shown in FIGS. 11 through 13.

As shown throughout the Figures and, more particularly in FIG. 14, the actuating plate 30 defines a plate first or internal surface 60 and an opposed plate second or external surface 62. The guiding slot 58 typically extends through the piston attachment section 34 of the actuating plate 30 between the plate first and second surfaces 60, 62.

The piston-to-plate coupling means or assembly 54 typically also includes a rod coupling block 64 anchored to the piston rod 50 typically adjacent its distal end. The rod coupling block 64 defines a block abutment surface 66 facing substantially towards the plate first surface 60. The rod coupling block 64 typically extends substantially perpenticularly from the block abutment surface 66.

The piston-to-plate coupling means or assembly 54 typically also includes a pin-retaining component 68 mounted on the rod coupling pin 56 in an outwardly spaced relationship relative to the block abutment surface 66 so as to define a circumferential plate receiving section 70 (shown in greater detail in FIG. 8) between the pin retaining component 68 and the block abutment surface 66. The plate receiving section 70 is inserted in the guiding slot 58 with the block abutment surface 66 and the pin-retaining component 68 positioned substantially adjacent respectively to the plate first and second surfaces 60, 62 for preventing the lateral withdrawing of the rod coupling pin 56 from the guiding slot 58 as the rod coupling pin 56 slides along the guiding slot 58.

The actuating plate 30 typically has a substantially elongated configuration defining a plate first longitudinal edge 72 and a plate second longitudinal edge 74. The plate first longitudinal edge 72 is located substantially above the plate second longitudinal edge 74 when the actuating plate 30 is in the plate retracted configuration.

The guiding slot 58 defines a slot proximal end 76 and a slot distal end 78. The slot proximal and distal ends 76, 78 are positioned respectively more proximally and more distally relative to the wheel attachment section 32. The guiding slot 58 typically has a substantially curved configuration and is typically substantially convex relative to the plate first longitudinal edge 74.

Typically, the plate pivotal axis 36 and the slot proximal end 76 are located substantially at the same height. The guiding slot 58 is provided with a slot locking segment 80 located substantially adjacent the proximal end 76. The slot locking segment 80 has a smaller radius of curvature than the remainder of the guiding slot 58.

Typically, the slot proximal and distal ends 76, 78 are also located respectively more proximally and distally relative to the plate second longitudinal edge 74. The guiding slot 58 is configured and sized so that the slot distal end 78 is located in a substantially overlying relationship relative to the wheel rotation axis 42 when the actuating plate 30 is in the plate deployed configuration. Typically, the guiding slot 58 is also configured and sized so that the slot distal end 76 is located on the same side as the wheel rotation axis 42 relative to the plate pivotal axis 36.

The piston sleeve 52 is typically pivotally attached to the ski 12 by a piston-to-ski attachment means or assembly generally indicated by the reference numeral 82. The piston-to-ski attachment means or assembly 82 allows the piston sleeve 52 to remain attached to the ski 12 while pivoting relative to the ski 12 about two different sleeve pivotal axes. The piston sleeve 52 is attached to the ski 12 so as to pivot substantially upwardly and laterally outwardly relative to the ski longitudinal axis 26 when the piston rod 50 moves from the receded configuration towards the rod extended configuration. Typically, although by no means exclusively, as shown throughout the Figures, the piston-to-ski attachment means or assembly 82 includes a ball-and-socket type assembly.

The wheel and piston attachment sections 32, 34 of the actuating plate 30 are typically angled relative to each other such that when the actuating plate 30 is in the plate deployed configuration, the wheel attachment section 32 is in a substantially parallel relationship relative to the ski longitudinal axis 26 and the piston attachment section 34 is in a substantially parallel relationship relative to the piston-type actuator 46.

Typically, although by no means exclusively, the piston attachment section 34 is bent relative to the wheel attachment section 32 about a bending line. Bending of the piston attachment section 34 relative to the wheel attachment section 32 is typically facilitated by a notch 84 formed in the actuating plate 30 and typically extending from the plate first longitudinal edge 72.

The wheel unit 10 typically further includes a unit mounting structure generally indicated by the reference numeral 86 for mounting the wheel unit 10 to the ski 12. The unit mounting structure 86 typically includes a base plate 88 defining a base plate first end 89 and a substantially opposed base plate second end 90. The base plate 88 has a pair of first mounting flanges 92 and a pair of second mounting flanges 94 extending substantially perpendicularly and downwardly therefrom respectively adjacent the base plate first and second ends 88, 89.

A first mounting bolt 96 and a second mounting bolt 98 extend respectively between the first and second pairs of mounting flanges 92, 94. The first and second mounting bolts 96, 98 are adapted to be secured to any suitable securing structure attached to the ski 12. For example, as shown in FIG. 1, the first mounting bolt 96 may be secured to the ski flanges 28 while the second mounting bolt 98 may be secured at a location used for securing the conventional king pin (not shown). Again, it should be understood that any suitable mounting means for mounting the wheel unit 10 to the ski 12 could be used without departing from the scope of the present invention.

Typically, the wheel unit 10 further includes a piston mounting wall 100 extending substantially upwardly from the base plate 88 substantially adjacent the base plate first end 89. The ball-and-socket type assembly may be secured to the piston mounting wall 100 for pivotally connecting the piston cylinder 52 to the latter. Also, typically, a guard plate 102 extends from the unit mounting structure 86 and/or from the piston mounting wall 100 for at least partially shielding the piston-type actuator 46. The guard plate 102 is adapted to deflect objects that could otherwise impact the piston-type actuator 46.

Figure 15:
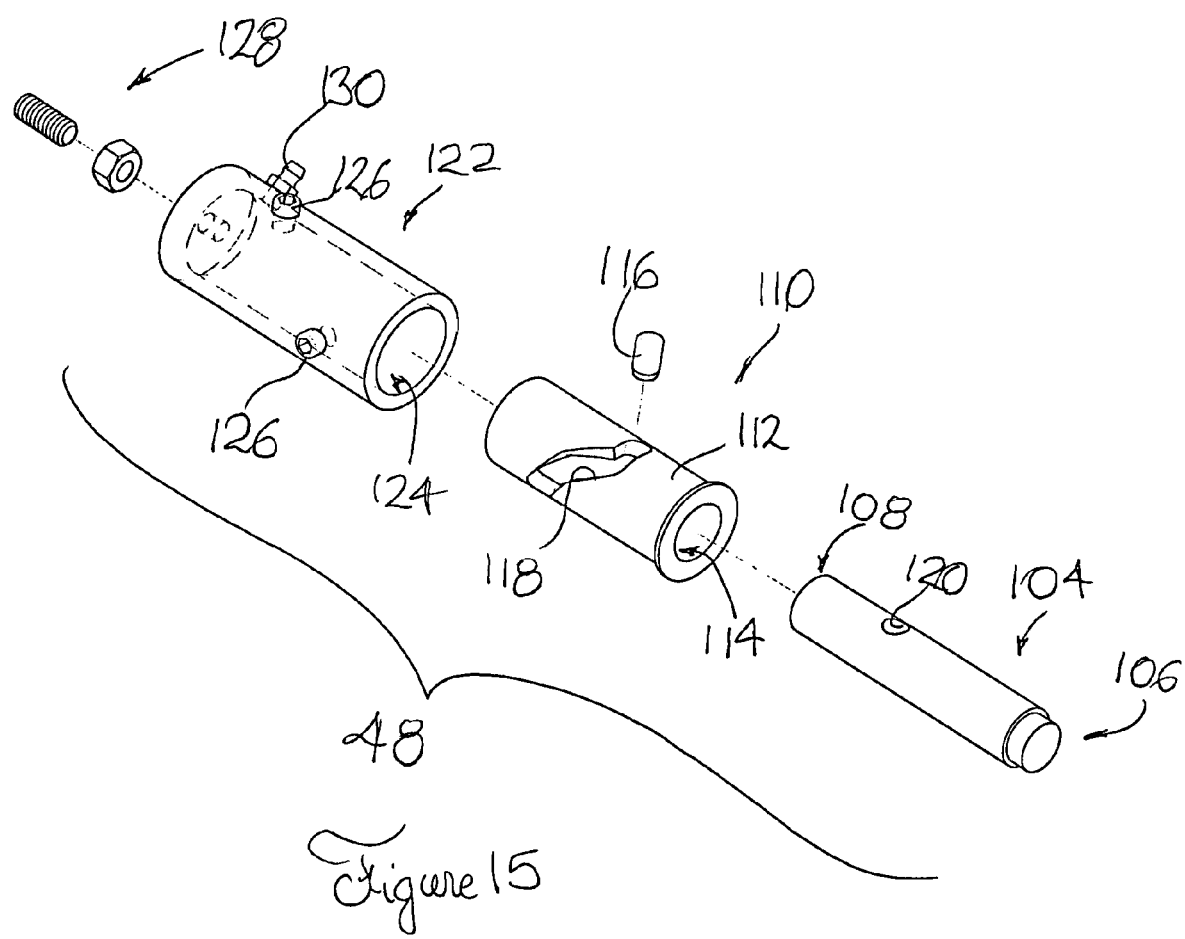
FIG. 15, in an exploded view, illustrates a transversal moving assembly part of the wheel unit in accordance with an embodiment of the present invention.

Referring now more specifically to FIG. 15, there is shown in greater detail some of the features of the plate transversal moving means or assembly 48. The plate transversal moving means typically include a substantially cylindrical biasing bar 104. The biasing bar 104 defines a bar first end 106 and a longitudinally opposed bar second end 108.

The biasing bar 104 is attached to the actuating plate 30 substantially adjacent the bar first end 106 for rotating jointly therewith about the plate pivotal axis 36. The bar first end 106 may be attached to the actuating plate 30 by any suitable means such as by sliding the portion of the biasing bar 104 into a corresponding aperture provided in the actuating plate 30 and welding or otherwise fixing the biasing bar 104 to the actuating plate 30.

The plate transversal moving means or assembly 48 also includes a bar receiving sleeve 110. The bar receiving sleeve 110 has a sleeve peripheral wall 112 defining a sleeve channel 114 for receiving at least a portion of the biasing bar 104. The biasing bar 104 is at least partially insertable into the sleeve channel 114 for rotation therein about the plate pivotal axis 36 and for sliding movement therein along the plate pivotal axis 36.

A tongue and groove arrangement is provided for mechanically coupling the sleeve peripheral wall 112 and the biasing bar 104 such that upon the biasing bar 104 being rotated about the plate pivotal axis 36, the biasing bar 104 is induced into a translational sliding movement along the plate pivotal axis 36 by the configuration of the groove part of the tongue and groove arrangement.

Typically, the tongue and groove arrangement includes a tongue 116 extending substantially radially outwardly from the outer surface of the biasing bar 104 and a groove 118 formed in the sleeve peripheral wall 112. Typically, although by no means exclusively, the tongue 116 is secured to a corresponding tongue fixing aperture 120 formed in the biasing bar 104 and the groove 118 extends through the sleeve peripheral wall 112 for facilitating the assembly of the biasing bar 104 and the bar receiving sleeve 110 together.

Typically, the plate transversal moving means or assembly 48 further includes a protective cover 122 for at least partially shielding the bar receiving sleeve 110 and anchoring the latter to the remainder of the wheel unit 10. Typically, the protective cover 122 defines a cover channel 124 for substantially fittingly receiving the bar receiving sleeve 110. Releasable securing means such as screws 126 extending through the peripheral wall of the protective cover 122 into the cover channel 124 are used for frictionally retaining the bar receiving sleeve 112 thereinto. The protective cover 122 may be secured to the remainder of the wheel unit, for example, by a bolt and nut assembly 128 fastened to the mounting structure 86.

The embodiments of the invention in which an exclusive privilege or property is claimed are defined as follows:

1. A wheel unit mountable on a ski of a ski-mounted vehicle, said ski having a ski gliding surface for traveling over a ground surface, a substantially opposed ski upper surface, a ski inner side surface, a substantially opposed ski outer side surface, said ski defining a ski longitudinal axis; said wheel unit comprising:

an actuating plate, said actuating plate defining a wheel attachment section and a piston attachment section, said actuating plate being pivotally attached to said ski substantially intermediate said wheel and piston attachment sections for pivotal movement about a plate pivotal axis;

a wheel attachment means for rotatably attaching said wheel to said wheel attachment section for rotation about a wheel rotation axis;

an actuator operatively coupled to said actuating plate for selectively pivoting said actuating plate about said plate pivotal axis between a plate deployed configuration and a plate retracted configuration wherein in said plate deployed configuration the position of said actuating plate is such that said wheel protrudes at least partially below said ski gliding surface for engaging said ground surface and in said plate retracted configuration the position of said actuating plate is such that said wheel is retracted above said ski gliding surface for preventing said wheel from engaging said ground surface;

a plate transversal moving means operatively coupled to said actuating plate for selectively moving said actuating plate substantially transversally relative to said ski.

2. A wheel unit as recited in claim 1 wherein said plate transversal moving means is operatively coupled to said actuating plate so as to automatically move said actuating plate substantially transversally relative to said ski longitudinal axis in a predetermined direction upon said actuating plate being pivoted about said plate pivotal axis, wherein when said actuating plate is pivoted towards said plate deployed configuration said actuating plate is simultaneously displaced substantially laterally outwardly relative to said ski-mounted vehicle and when said actuating plate is pivoted towards said plate retracted configuration said actuating plate is simultaneously displaced substantially laterally inwardly relative to said ski-mounted vehicle;

whereby when said actuating plate is simultaneously pivoted towards said plate deployed configuration and displaced substantially laterally outwardly relative to said ski-mounted vehicle said wheel is moved towards a wheel ground engaging position and when said actuating plate is simultaneously pivoted towards said plate retracted configuration and displaced substantially laterally inwardly relative to said ski-mounted vehicle said wheel is moved towards a wheel ground clearing position, said wheel ground engaging position being located at a lower and more outwardly lateral location then said wheel ground clearing position.

3. A wheel unit as recited in claim 1 wherein said actuator is a piston-type actuator, said piston-type actuator having a piston rod and a piston sleeve, said piston rod being movable relative to said piston sleeve between a rod receded configuration and a rod extended configuration; said wheel unit also including a piston-to-plate coupling means for coupling said piston rod to said piston attachment section of said actuating plate, said piston-to-plate coupling means allowing the conversion of the linear movement of said piston rod between said rod receded and extended configurations into a pivotal movement of said actuating plate about said plate pivotal axis between said plate retracted and plate deployed configurations.

4. A wheel unit as recited in claim 3 wherein said piston-to-plate coupling means includes a rod coupling pin extending substantially laterally from said piston rod and a guiding slot formed in said piston attachment section of said actuating plate, said guiding slot being configured, sized and positioned for receiving and slidably guiding at least a portion of said rod coupling pin for converting the linear movement of said piston rod between said rod receded and extended configurations into a pivotal movement of said actuating plate about said plate pivotal axis between said plate retracted and plate deployed configurations.

5. A wheel unit as recited in claim 4 wherein said actuating plate defines a plate first surface and a plate second surface, said guiding slot extending through said piston attachment section of said actuating plate between said plate first and second surfaces; said piston-to-plate coupling means including a rod coupling block anchored to said piston rod, said rod coupling block defining a block abutment surface facing substantially towards said plate first surface, said rod coupling block extending substantially perpendicularly from said block abutment surface; said piston-to-plate coupling means also including a pin retaining component mounted on said rod coupling pin in an outwardly spaced relationship relative to said block abutment surface so as to define a circumferential plate receiving section on said rod coupling pin between said pin retaining component and said block abutment surface; said plate receiving section being inserted in said guiding slot with said block abutment surface and said pin retaining component positioned substantially adjacent respectively to said plate first and second surfaces for preventing the lateral withdrawing of said rod coupling pin from said guiding slot as said rod coupling pin slides along said guiding slot.

6. A wheel unit as recited in claim 4 wherein said actuating plate has a substantially elongated configuration, said actuating plate defining a plate first longitudinal edge and a plate second longitudinal edge, said plate first longitudinal edge being located substantially above said plate second longitudinal edge when said actuating plate is in said plate retracted configuration; said guiding slot defining a slot proximal end and a slot distal end said slot proximal and distal ends being positioned respectively more proximally and more distally relative to said wheel attachment section, said guiding slot having a substantially curved configuration and being substantially convex relative to said plate first longitudinal edge.

7. A wheel unit as recited in claim 6 wherein said plate pivotal axis and said slot proximal end are located substantially at the same height, said guiding slot being provided with a slot locking segment located substantially adjacent to said slot proximal end, said slot locking segment having a smaller radius of curvature then the remainder of said guiding slot.

8. A wheel unit as recited in claim 6 wherein said slot proximal and distal ends are also located respectively more proximally and distally relative to said plate second longitudinal edge, said guiding slot being configured and sized so that said slot distal end is located in a substantially overlying relationship relative to said wheel rotation axis when said actuating plate is in said plate deployed configuration.

9. A wheel unit as recited in claim 8 wherein said piston sleeve is pivotally attached to said ski by a piston-to-ski attachment means for allowing said piston sleeve to remain attached to said ski while pivoting relative to said ski about two different sleeve pivotal axes; said piston sleeve being attached to said ski so as to pivot substantially upwardly and laterally outwardly relative to said ski longitudinal axis when said piston rod moves from said rod receded configuration towards said rod extended configuration.

10. A wheel unit as recited in claim 9 wherein said piston-to-ski attachment means includes a ball and socket-type assembly.

11. A wheel unit as recited in claim 9 wherein said wheel and piston attachment sections of said actuating plate are angled relative to each other such that when said actuating plate is in said plate deployed configuration, said wheel attachment section is in a substantially parallel relationship relative to said ski longitudinal axis and said piston attachment section is in a substantially parallel relationship relative to said piston-type actuator.

12. A wheel unit as recited in claim 9 wherein said wheel unit includes a unit mounting structure for mounting said wheel unit to said ski, said unit mounting structure including a base plate defining a base plate first end and a substantially opposed base plate second end, said base plate having a pair of first mounting flanges and a pair of second mounting flanges extending substantially perpendicularly therefrom respectively adjacent said base plate first and second end; a first mounting slot and a second mounting bolt extend respectively between said first and second pairs of mounting flanges; a piston mounting wall extends substantially upwardly from said base plate substantially adjacent said base plate first end.

13. A wheel unit as recited in claim 12 further comprising a guard plate extending from said unit mounting structure for at least partially shielding said piston-type actuator.

14. A wheel unit as recited in claim 1 wherein said plate transversal moving means includes a substantially cylindrical biasing bar, said biasing bar defining a bar first end, a longitudinally opposed bar second end; said biasing bar being attached to said actuating plate substantially adjacent to said bar first end for rotating jointly therewith about said plate pivotal axis;

a bar receiving sleeve, said bar receiving sleeve having a sleeve peripheral wall defining a sleeve channel for receiving at least a portion of said biasing bar; said biasing bar being at least partially insertable in said sleeve channel for rotation therein about said plate pivotal axis and for sliding movement therein along said plate pivotal axis;

a tongue and groove arrangement mechanically coupling said sleeve peripheral wall and said biasing bar such that upon said biasing bar being rotated about said plate pivotal axis, said biasing bar is induced into a translational sliding movement along said plate pivotal axis by the configuration of said groove part of said tongue and groove arrangement.

15. A wheel unit as recited in claim 14 wherein said tongue and groove arrangement includes a tongue extending substantially radially outwardly from the outer surface of said biasing bar and said groove is formed in said sleeve peripheral wall.

16. A wheel unit as recited in claim 15 further comprising a protective cover for at least partially shielding said bar receiving sleeve and anchoring the latter to the remainder of said wheel unit.

17. A wheel unit mountable on a ski of a ski-mounted vehicle, said ski having a ski gliding surface for traveling over a ground surface, a substantially opposed ski upper surface, a ski inner side surface, a substantially opposed ski outer side surface, said ski defining a ski longitudinal axis; said wheel unit comprising:

an actuating plate, said actuating plate defining a wheel attachment section and a piston attachment section, said actuating plate being pivotally attached to said ski substantially intermediate said wheel and piston attachment sections for pivotal movement about a plate pivotal axis;

a wheel attachment assembly for rotatably attaching said wheel to said wheel attachment section for rotation about a wheel rotation axis;

an actuator operatively coupled to said actuating plate for selectively pivoting said actuating plate about said plate pivotal axis between a plate deployed configuration and a plate retracted configuration wherein in said plate deployed configuration the position of said actuating plate is such that said wheel protrudes at least partially below said ski gliding surface for engaging said ground surface and in said plate retracted configuration the position of said actuating plate is such that said wheel is retracted above said ski gliding surface for preventing said wheel from engaging said ground surface;

a plate transversal moving assembly operatively coupled to said actuating plate for selectively moving said actuating plate substantially transversally relative to said ski.

* * * * *